United States Patent [19]

Farafontov et al.

[11] 4,148,863

[45] Apr. 10, 1979

[54] METHOD OF PREPARING POLYCRYSTALLINE CUBIC BORON NITRIDE

[75] Inventors: Vladimir I. Farafontov, Leningradskaya oblast; Mirra I. Sokhor, Leningrad; Natalia G. Kushkova, Leningrad; Viktor V. Digonsky, Leningrad; Vladislav S. Lysanov, Leningrad, all of U.S.S.R.

[73] Assignee: Vsesojuzny Nauchni-Issledovatelsky Institut Abrazivov I Shlifovania, Leningrad, U.S.S.R.

[21] Appl. No.: 919,906

[22] Filed: Jun. 28, 1978

[30] Foreign Application Priority Data

Jul. 7, 1977 [SU] U.S.S.R. ............................. 2502649

[51] Int. Cl.² .......................................... C01B 21/06
[52] U.S. Cl. .................................. 423/290; 51/307; 51/309
[58] Field of Search ................. 423/290; 51/307, 309

[56] References Cited

U.S. PATENT DOCUMENTS

| 3,189,412 | 6/1965 | Wood et al. | 423/290 |
| 3,692,474 | 9/1972 | Arber et al. | 423/290 X |
| 3,852,078 | 12/1974 | Wakatsuki et al. | 51/307 X |
| 3,890,430 | 6/1975 | Bakul et al. | 423/446 |

FOREIGN PATENT DOCUMENTS 50-8800  1/1975  Japan .................................. 423/290

*Primary Examiner*—G. O. Peters
*Attorney, Agent, or Firm*—Fleit & Jacobson

[57] ABSTRACT

According to the invention, a method of preparing polycrystalline cubic boron nitride resides in that hexagonal boron nitride is subjected to the action of pressure of 40–90 kbar and temperature of 1200°–2400° C. in the presence of a catalyst, namely, a zinc compound.

The proposed method makes it possible to increase considerably wear resistance of polycrystalline cubic boron nitride used in tools for working hardened steels and alloys.

4 Claims, No Drawings

METHOD OF PREPARING POLYCRYSTALLINE CUBIC BORON NITRIDE

FIELD OF APPLICATION OF THE INVENTION

The present invention relates to producing superhard materials and more particularly to a method of preparing polycrystalline cubic boron nitride which can be used in various branches of engineering as a cutting tool for high-efficient treating hardened steels and alloys.

BACKGROUND OF THE INVENTION

Known in the art are methods of preparing polycrystalline cubic boron nitride from hexagonal boton nitride at high pressures and temperatures in the presence of catalysts such as alkaline, alkaline-earth metals, tin, lead, antimony, as well as nitrides of the above-cited metals (K. Svenson, "High-Pressure Physics", Moscow, 1963, in Russian). In additiona, as catalysts use can be made of water of compounds liberating water in the process of synthesis.

According to the known methods, the catalysts are introduced into the charge either in the form of separate chemical compounds or as compounds which can decompose to said catalysts under the action of high pressures and temperatures. Known methods make it possible to prepare polycrystalline cubic boron nitride containing the products of interaction of the catalyst with boron nitride, which causes gradual weakening of the boron nitride crystalline structure.

Also known in the art is a method of preparing boron nitride of cubic structure residing in that hexagonal boron nitride is subjected to the action of pressure of 40–90 kbar and temperature of 1200°–2400° C. in the presence of a catalyst. As a catalyst use is made of alkaline, alkaline-earth metals, nitrides thereof, as well as antimony, tin, or lead.

In the process use can also be made of a mixture of two and more catalysts and of alloys containing catalysts and non-catalyst metals. The prepared boron nitride contains the products of interaction thereof with a catalyst, for instance, $Li_3BN_2$, $Mg_3BN_3$.

The method is disadvantageous in that the prepared boron nitride contains the products of interaction thereof with a catalyst. These compounds have a low melting point, high reactivity, and decompose rapidly in humid air.

Being in the bulk of polycrystalline formations of boron nitride, the above-cited compounds in the process of treating hardened steels and alloys at high temperatures favour destruction of cutting edges of the tools manufactured from boron nitride.

BRIEF DESCRIPTION OF THE INVENTION

It is an object of the invention to increase wear resistance of polycrystalline cubic boron nitride used in tools for working hardened steels and alloys.

Said object is accomplished by that in a method of preparing polycrystalline cubic boron nitride hexagonal boron nitride is subjected to the action of pressure 40–90 kbar and temperature 1200°–2400° C. in the presence of a catalyst which is a zinc compound.

The proposed catalyst diffuses easily into the bulk of hexagonal boron nitride at high temperatures and pressures, ensuring a complete transformation of said boron nitride into a cubic modification. The catalyst, remaining in the bulk of polycrystalline cubic boron nitride, affects to a lesser degree the weakening of polycrystals than the catalysts used heretofore. This ensures high wear resistance of polycrystalline cubic boron nitride employed in cutting tools.

It is expedient to use as a zinc compound zinc oxide, hydroxide, nitride or amide, or mixtures thereof in amounts of 0.1–12 wt.%.

The use of the proposed compound in amounts less than 0.1 wt.% is undesirable, since transformation of hexagonal boron nitride into cubic one is incomplete.

The use of the proposed compound in amounts over 12 wt.% is inexpedient, since the strength properties of polycrystalline cubic boron nitride decrease considerably.

DETAILED DESCRIPTION OF THE INVENTION

The herein-proposed method is accomplished in the following way.

Powders of hexagonal boron nitride and of a catalyst are mixed until a homogeneous mixture is obtained. The mixture is pressed into briquettes and placed into a high-pressure chamber where it is subjected to high pressure (40–90 kbar) and temperature (1600°–2400° C.). The final product is polycrystalline cubic boron nitride.

The catalyst is a zinc compound, preferably oxide, hydroxide, nitride, amide, or a mixture thereof in amounts of 0.1–12 wt.%. To attain a more uniform distribution of the catalyst in hexagonal boron nitride, the catalyst is used in the form of solution with subsequent evaporation or precipitation. Preparation of polycrystalline cubic boron nitride with prescribed properties does not depend on the ratio of ingredients in the initial reaction mixture or on the duration of pressure and temperature action period.

The agreement between the actual properties of the resultant polycrystalline cubic boron nitride and the prescribed properties is evaluated by wear resistance in a cutting tool. By wear resistance here implies wearing (in mm) of a cutting edge upon turning treatment of hardened steel for 5 minutes. The cutting parameters are: speed $V=100$ m/min, feed $S=0.07$ mm/rev., cutting depth $\delta=0.2$ mm.

The herein-proposed method makes it possible to increase considerably, as compared with the known methods, the wear resistance of polycrystalline cubic boron nitride used in tools for working hardened steels and alloys.

Specific examples of realizing the proposed method are given hereinbelow by way of illustration.

EXAMPLE 1

Powders of hexagonal boron nitride (98 wt.%) and zinc oxide (2 wt.%) are mixed. The mixture obtained is pressed into briquettes and placed into a high-pressure chamber where it is subjected to the action of 65 kbar and 1600° C.

The final product is polycrystalline cubic boron nitride with wear resistance of 0.12 mm.

EXAMPLE 2

A powder of hexagonal boron nitride is introduced into a catalyst which is an aqueous solution of zinc chloride. The obtained mixture is treated with an aqueous solution of ammonia, then evaporated and roasted at 420° C. The prepared mixture containing 98 wt.% of hexagonal boron nitride and 2 wt.% of zinc oxide is treated by following the procedure described in Example 1.

The final product is polycrystalline cubic boron nitride with wear resistance of 0.08 mm.

EXAMPLE 3

Powders of hexagonal boron nitride (98 wt.%) and zinc oxide (2 wt.%) are mixed. The obtained mixture is pressed into briquettes and placed into a high-pressure chamber where it is subjected to the action of 90 kbar and 2400° C.

The final polycrystalline cubic boron nitride has a wear resistance of 0.07 mm.

EXAMPLE 4

Powders of hexagonal boron nitride (99.9 wt.%) and zinc oxide (0.1 wt.%) are mixed. The obtained mixture is treated by following the procedure described in Example 3. The final polycrystalline cubic boron nitride has a wear resistance of 0.10 mm.

EXAMPLE 5

Powders of hexagonal boron nitride (88 wt.%) and zinc oxide (12 wt.%) are mixed. The obtained mixture is treated by following the procedure described in Example 3. Wear resistance of the polycrystalline boron nitride is 0.14 mm.

EXAMPLE 6

Powders of hexagonal boron nitride (99.9 wt.%) and zinc hydroxide (0.1 wt.%) are mixed. The obtained mixture is treated by following the procedure described in Example 3. Polycrystalline cubic boron nitride has a wear resistance of 0.10 mm.

EXAMPLE 7

Powders of hexagonal boron nitride (88 wt.%) and zinc oxide (12 wt.%) are mixed. The obtained mixture is treated by following the procedure described in Example 3. Wear resistance of the final polycrystalline cubic boron nitride is 0.15 mm.

EXAMPLE 8

Powders of hexagonal boron nitride (99.9 wt.%) and zinc nitride (0.1 wt.%) are mixed. The obtained mixture is treated by following the procedure described in Example 3. Wear resistance of the prepared polycrystalline cubic boron nitride is 0.10 mm.

EXAMPLE 9

Powders of hexagonal boron nitride (88 wt.%) and zinc nitride (12 wt.%) are mixed. The obtained mixture is treated by following the procedure described in Example 3. Polycrystalline cubic boron nitride prepared has a wear resistance of 0.14 mm.

EXAMPLE 10

Powders of hexagonal boron nitride (99.9 wt.%) and zinc amide (0.1 wt.%) are mixed. The obtained mixture is treated by following the procedure described in Example 3. The prepared polycrystalline cubic boron nitride has a wear resistance of 0.11 mm.

EXAMPLE 11

Powders of hexagonal boron nitride (88 wt.%) and zinc amide (12 wt.%) are mixed. The obtained mixture is treated by following the procedure described in Example 3. Wear resistance of the prepared polycrystalline cubic boron nitride is 0.15 mm.

EXAMPLE 12

The powders of hexagonal boron nitride (88 wt.%), zinc amide (6 wt.%) and zinc nitride (6 wt.%) are mixed. The obtained mixture is treated by following the procedure described in Example 3. The prepared polycrystalline cubic boron nitride has a wear resistance of 0.13 mm.

EXAMPLE 13

The powders of hexagonal boron nitride (90 wt.%), zinc oxide (8 wt.%), zinc amide (1 wt.%), and zinc hydroxide (1 wt.%) are mixed. The obtained mixture is treated by following the procedure described in Example 3. The prepared polycrystalline cubic boron nitride has a wear resistance of 0.09 mm.

What we claimed is:

1. A method of preparing polycrystalline cubic boron nitride residing in that hexagonal boron nitride is subjected to pressure of 40–90 kbar and temperature of 1200°–2400° C. in the presence of a catalyst which is a zinc compound.

2. A method as claimed in claim 1, wherein a zinc compound is used selected from the group consisting of zinc oxide, hydroxide, amide, nitride, or a mixture thereof.

3. A method as claimed in claim 1, wherein a zinc compound is used in amounts of 0.1–12 wt.%.

4. A method as claimed in claim 1, wherein the process is run at 65–90 kbar and 1600°–2400° C.

* * * * *